United States Patent Office 3,385,770
Patented May 28, 1968

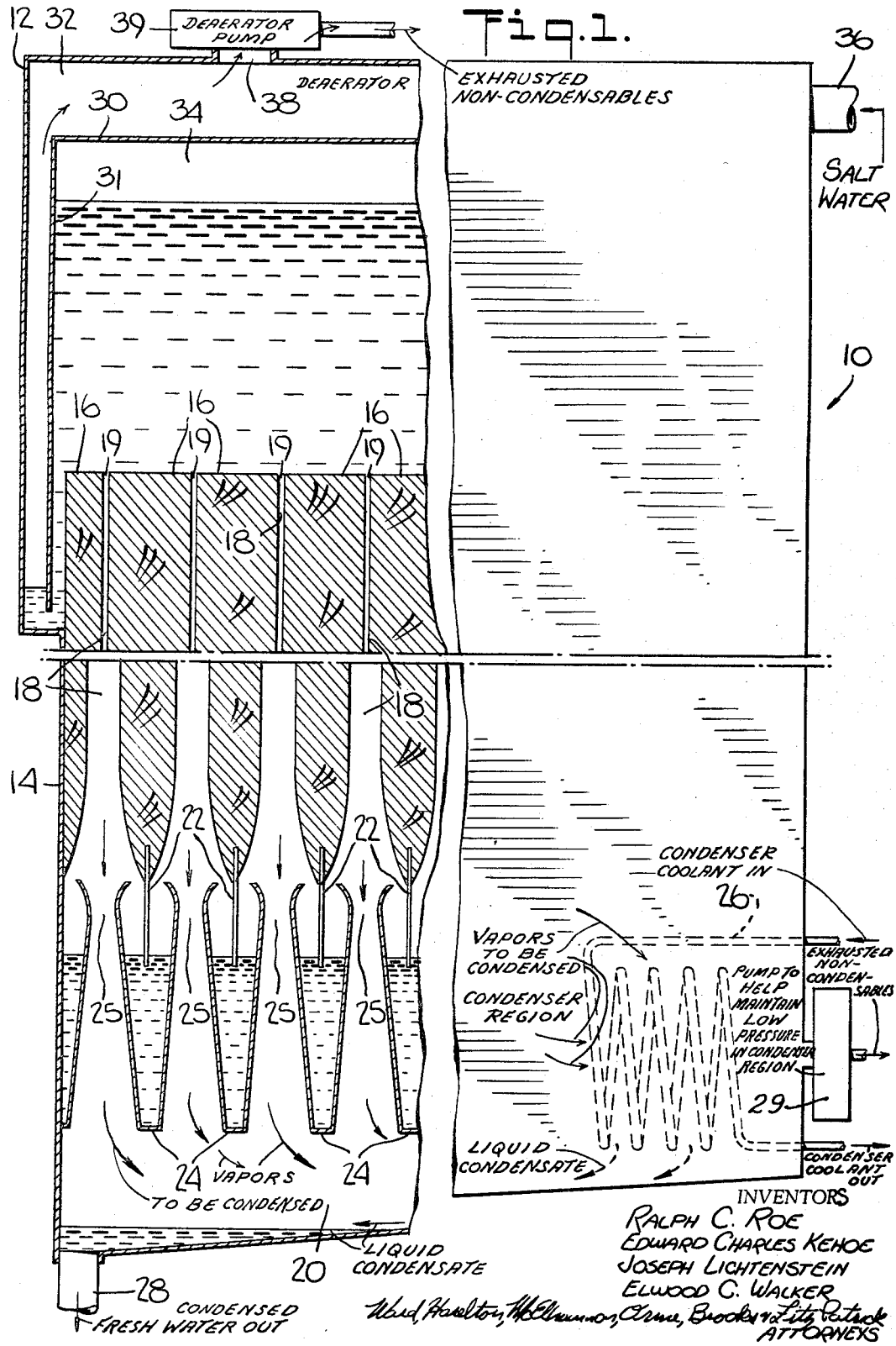

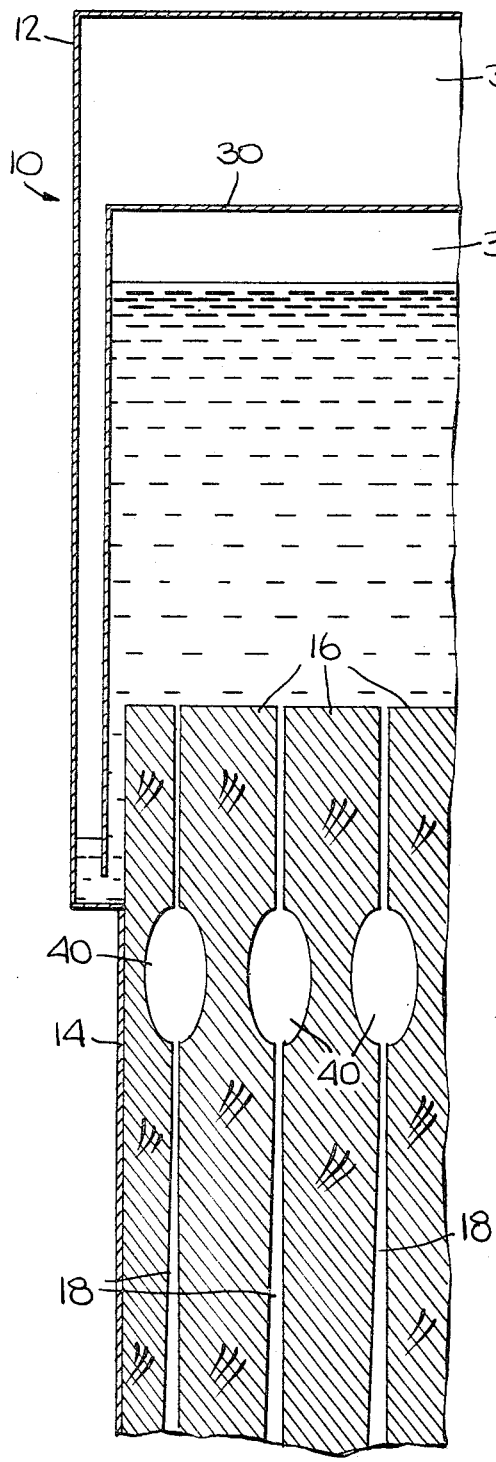
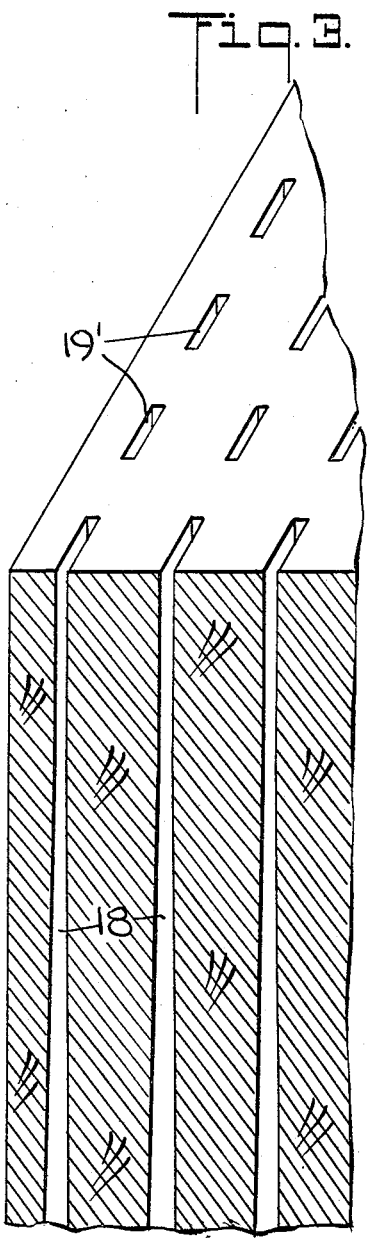

3,385,770
APPARATUS FOR USE IN EVAPORATIVE PROCESSES
Ralph C. Roe, Tenafly, and Edward Charles Kehoe, North Caldwell, N.J., Joseph Lichtenstein, Bayside, N.Y., and Elwood C. Walker, North Caldwell, N.J., assignors, by mesne assignments, to Saline Water Conversion Corporation, a corporation of New York
Filed Sept. 17, 1964, Ser. No. 397,263
7 Claims. (Cl. 202—236)

ABSTRACT OF THE DISCLOSURE

An evaporation system including a vertically extending vaporization conduit, the upper end of which opens fully into an upper liquid reservoir so that liquid from the reservoir can flow freely and directly down into the conduit filling its upper end, and a lower region maintained at low pressure and into which the lower end of the conduit extends, the arrangement serving to obtain falling film vaporization of the controlled flash variety whereby the vapors thus formed serve to maintain the falling liquid in a film configuration.

---

This invention relates to liquid processing systems and more particularly it concerns an improved evaporator arrangement for use with saline water purification apparatus.

In evaporative type desalinization processes, sea water or other saline water is first vaporized. The vapors are then separated from any residual or unevaporated liquid; and, finally the separated vapors are recondensed thereby producing purified or saline free water.

A novel and particularly effective system for achieving such evaporative type desalinization is shown and described in a co-pending application Ser. No. 241,465, filed Nov. 27, 1962, now Patent Number 3,214,350. According to this novel system, heated saline water is caused to flow down through enclosed vaporization channels. The upper portions of these channels are maintained at a pressure in the vicinity of the saturation pressure corresponding to the inlet temperature of the heated saline water. The lower portions of the channels are maintained at a substantially lower pressure. As the heated saline water proceeds down through the channels, it experiences a gradual decrease in pressure. As a result of this, evaporation of the water takes place in even increments. The thus formed steam proceeds rapidly toward the lower end of the channels and the downward velocity of this steam serves to sustain an even pressure distribution along the length of the channels.

It is particularly important in the above-described and in all other evaporative type desalinization systems, to expose as much surface area of the saline water as possible in order to achieve most efficient evaporation. One manner of accomplishing this has been to distribute the saline water to flow down over large evaporation plates in thin film configuration. This has been a particularly difficult technique however, especially where large quantities of water are to be processed. The reason for this is that the formation and maintenance of these thin films has required extreme precision in manufacture and maintenance of both the plates and their associated distribution apparatus. Generally the heated saline water would be caused to flow through troughs whose upper edges were coincident with the upper edges of the evaporator plates. As the water in the troughs rose to overflowing, it would spill down over the edge of the plates and flow down over the outer surfaces in thin film configuration. However, unless the troughs and plates were maintained perfectly flat and level, the necessary distribution would be lost for great quantities of water would flow over the lowermost portions of the plates while no water would flow over the higher portions. This situation becomes more and more aggravated as the capacity of the system was increased by use of larger and more extensive plates and troughs.

According to the present invention, the above described difficulties have been overcome by means of a very simple structure. The present invention is based upon the discovery that the enclosed vaporization channels of the system described in the aforementioned application do not require a preformed film of water at their upper ends. Because of the fact that within these channels there is automatically maintained a pressure distribution which varies gradually from a higher pressure at the top of the channels to a lower pressure at the bottom of the channels, it is possible to expose the entire upper opening of each of the channels to a reservoir containing water to a level higher than these openings.

Thus our invention includes the combination of vertically aligned enclosed vaporization channels the upper ends of which open into a common liquid reservoir within which liquid is maintained at a level above the upper openings of the channels. This arrangement enables distribution of the saline water into a great number of evaporation channels without adverse effects due to possible dimensional irregularities or misalignments among the channels.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

Specific embodiments of the invention have been chosen for purposes of illustration and description, and are shown in the accompanying drawings, forming a part of the specification, wherein:

FIG. 1 is a side elevational view, partially in section and partially cut away, illustrating one embodiment of my invention;

FIG. 2 is a fragmentary section view illustrating a modified portion of the embodiment of FIG. 1; and FIG. 3 is a fragmentary perspective view showing a further modification.

The desalinization system shown in FIG. 1 is made up of an outer housing 10 which completely encloses and seals the internal regions of the system from atmospheric pressure. Within the outer housing 10, there is provided a reservoir region 12 and a channel region 14. A plurality of vertical plates 16 are closely aligned in side by side relationship within the channel region 14. The tops of the plates extend a short distance up into the reservoir region 12 of the system. These vertical plates may be of almost any solid material, although, as will become more apparent in connection with the description of the operation of the unit, the plates are preferably of wood or other wettable material.

The vertical plates 16 are closely positioned so that they define the boundaries of enclosed evaporation channels 18 which extend down through the channel region 14 to a condenser region 20 near the bottom of the system. The manner in which the adjacent plates cooperate to form the evaporation channels is shown more fully in FIG. 2 of the aforementioned Lichtenstein Patent No. 3,214,350. The plates are shaped and positioned such that the channels 18 form orifices 19 at their upper ends, these orifices opening fully into the reservoir region 14. The bottoms of the vertical plates 16 are tapered inwardly so as to produce an outward flaring of the evaporation channels 18 in the condenser region 20. Fins 22 extend downwardly from the bottom of each of the vertical plates 16 so as to aid in directing residue (unevaporated saline water) down into residue troughs 24 which are located in the condenser region 20. A residue collection system (not shown) is provided to collect the unevaporated saline water from each of the troughs and to discharge it out of the system. The troughs are shaped so that the outer surfaces of adjacent troughs define diffusion nozzles 25 through which the steam developed within the evaporation channels 18 passes. This steam then impinges upon a condenser 26 located within the condenser region 20. The condenser 26 is maintained at a temperature below the evaporation temperature of the steam in the condenser region. This is done by pumping a coolant fluid from an external source (not shown) through the coils of the condenser. As the steam from the evaporation channels impinges upon the condenser surfaces it becomes cooled and is condensed to form purified water which collects at the bottom of the condenser region. This purified water is evacuated via a fresh water outlet 28. There is provided a condenser vent arrangement 29 for removing air and other non-condensibles from the condenser region. The condenser vent arrangement 29 together with the condenser cooperates to maintain a pressure within the condenser region which is lower than the pressure in the reservoir portion 12.

Within the reservoir region 12 of the system there is provided an inner housing 30 having an open bottom and a closed top. This inner housing has vertical sides 31 which extend down around the outside edges of the tops of the vertical plates 16. This serves to divide the reservoir region 12 into a deaeration chamber 32 and a feed reservoir 34. A saline water inlet 36 enters the outer housing 10 in the region of the deaeration chamber 32. At the top of the deaeration chamber 32 there is provided a vent opening 38 which is connected to a pumping means 39 which serves to exhaust from the system air and other non-condensibles which are released from the heated incoming saline water. The pumping means 39 further serves to maintain the pressure within the reservoir region 12 at a value close to the saturation pressure of the incoming saline water.

While the apparatus is capable of operation under a variety of conditions of pressure and temperature, an important advantage of the system lies in its ability to produce purified water from saline water which has been heated to a rather low temperature. Consequently, the following description of operation will be given in conjunction with a typical set of operating conditons:

During operation, saline water enters the system via the saline water inlet 36 and passes into the deaeration chamber 32 at a temperature of about 102° F. Meanwhile, by virtue of the vacuum produced at the vent opening 38, the total pressure within the deaeration chamber is maintained at a pressure of about 1.5 to 2.0 p.s.i.a. This very low pressure, while insufficient to cause immediate flashing of the 102° F. incoming saline water into steam, does cause the release of a considerable amount of dissolved air and other non-condensibles from the incoming water. The greater portion of these non-condensibles are removed vai the vent opening 38.

After the heated saline water passes through the deaeration chamber 32, it flows down between the vertical walls of the inner housing 30 and the outer housing 10 and then up into the feed reservoir 34. In the feed reservoir, the water is maintained at its 102° temperature and is subjected at its upper surface to 1.0078 p.s.i.a. In the example described, the head or height of water in the feed reservoir is maintained at approximately 6¼ inches above the vertical plates, thus creating a pressure at their upper ends of 1.2314 p.s.i.a. Since the evaporation channels 18 each open into the feed reservoir 34 via their orifices 19 which are defined by the tops of the vertical plates 16, each of the channels receives essentially the same flow.

As the saline water flows down through the evaporation channels 18, it gradually accelerates under the influence of gravity. Also the plates 16 taper slightly so that the cross sectional area of the channels becomes enlarged as the water flows downwardly. As a consequence of this, the pressure upon the saline water is reduced incrementally as it flows down the channels. Since the water at the top of the channels is near saturation, this incremental reduction in pressure eventually reaches a point below its saturation pressure. This causes vaporization of a small portion of the saline water.

The heat used in this vaporization is taken from the unevaporated water at each point in the channels so that as the water flows downwardly, each increment of pressure reduction is accompanied by a corresponding increment in vaporization and a slight lowering in temperature. Because of the great volume increase which accompanies the vaporization of the flowing liquid, the resulting steam in expanding tends to rush downwardly toward the condenser region. This rapid flow of steam through the channels maintains a smooth presure distribution along their length. This in turn serves to control the evaporation in such a manner that violent flashing is avoided and consequently the thermal efficiency of the system is improved over the conventional flash arrangement. As the flowing steam reaches the condenser region and impinges upon the condenser 26 it becomes cooled and condenses into pure liquid water which is withdrawn through the outlet 28. This condensation also produces a volumetric reduction in the condenser region which in turn maintains the pressure in this region at a value of about 0.7906 p.s.i.a. The temperature at the bottom of the evaporation channels will be about 94° F. or just at saturation corresponding to the pressure in the condenser region. It will thus be appreciated that the incoming saline water has effectively been "flashed" through an 8° F. temperature reduction. Yet the violence and inefficiency which characterize the conventional large vessel or sudden flash systems is eliminated.

It will be observed that before entry into the vaporization channels, the saline water is not first distributed into thin film configuration, but instead it is poured into the upper openings of the vaporization channels from the feed reservoir without any apparent control whatever. Yet the distribution efficiency of the present system is at a maximum and the unevaporated liquid at the bottom of the channel flows along the surfaces of the plates in evenly distributed thin film configuration.

While the complete theory underlying the operation of the present system is not fully developed, the following description is offered by way of explanation.

As warm saline water from the feed reservoir proceeds down through the channels, its pressure is lowered by the friction losses caused by this flow and by the fact that as steam is formed it increases in velocity as the pressure lowers which results in a velocity head in the steam in the channels. As the pressure is lowered the water, being at its saturation point at the entrance to the channels, begins to form bubbles which at first are small but which gradually increase in size until the upper portion of the channel has a foamy appearance. At the same time, the sides of the channels, being made with a hygroscopic surface such as wood, are wetted by the water and a water film begins to form on the sides of the channels.

The shear strength of liquid water to liquid water is comparatively high, but the shear strength of evaporated water (steam) to liquid water is zero, or it may be even negative as evidenced by the fact that the evaporated water in its endeavor to get away from the liquid water even asserts a certain amount of pressure and forms bubbles. As the liquid and steam continue down the chute, the water film around the steam bubbles comes into contact with the water film on the wettable surfaces of the channels. This contact ruptures the bubbles and the water which formed the bubbles becomes absorbed in the film surface. The surface film eventually becomes a solid, or nearly solid, water film along the sides of the channels with steam in the central regions. There is some slight swelling in the film due to the fact that temperature in the film thickness between the surface and the back of the film is not quite constant even though the film is compraatively thin, actually less than 3/64".

The water film proceeds the rest of the way down the channel surfaces in a turbulent fashion due to the tendency for the water to cling to wettable material. The liquid film in tending to cling to the channel surfaces while flowing downwardly produces transverse movement of the liquid water so that the warmer water is continuously brought to the outer film surface for better evaporation. The process in this region of the channels is actually more one of a diffusion than evaporation and little or no bubbles are formed at this point.

The evaporated water (steam) is further purified of any entrained moisture by the fact that toward the lower end of the evaporator channels the steam velocities become quite high. The flow is turbulent and in that turbulent flow any moisture or liquid in the evaporated water (steam) which touches the film surface is absorbed by the film surface. Therefore, there is continual drying of the steam as it progresses down the channels.

At the lower end of the channels, the water film, which is still salt water, follows the arcuate contours of the channel sides and flows down to the separating fin 22 at the bottom of the plates and into the residue collection troughs which carry the water back to a pump or siphon where it can be discharged to the atmosphere. Meanwhile, the evaporated water (steam) enters through pressure recovery diffusion nozzles 25 defined by the region between the residue collection troughs. Here a portion of the velocity head of the steam is converted to pressure before proceeding to the condenser.

In the alternate arrangement of FIG. 2, there are provided expansion chambers 40 formed by concave depressions in the vertical plates 16. These expansion chambers are located at a position below the tops of the plates such that the pressure on the saline water reaching the chambers is lowered to saturation pressure. The expansion chambers permit a somewhat more sudden drop in pressure than is experienced in the flow through the main portion of the channels. This sudden pressure drop will enhance the initial portion of the vaporization process in that it better permits the formation of steam bubbles within the flowing water and allows the formation of foam. In effect, the expansion chamber operates as an inversion device which converts a body of liquid bearing bubbles of steam to a body of steam bearing drops of liquid.

FIG. 3 illustrates an alternate configuration wherein the tops of the evaporation channels 18 are provided with orifices 19' which are shorter and wider than those previously described. This arrangement is chosen to feed the same channel surface area with the same volumetric flow as in the preceding embodiments. However by providing the wider orifices 19', broken into individual segments there is less likelihood of clogging the channels with foreign matter carried by the saline water than there would be in the case of the long narrow slit like openings to the vaporization channels.

Having thus described our invention with particular reference to the preferred form thereof, it will be obvious to those skilled in the art to which the invention pertains, after understanding our invention, that various changes and modifications may be made therein without departing from the spirit and scope of our invention, as defined by the claims appended thereto.

What is claimed as new and desired to be secured by Letters Patent is:

1. In an evaporative type saline water conversion system the combination comprising: an outer housing having an upper liquid reservoir region and a lower condenser region, a plurality of vertical plates located within said outer housing and positioned in side by side arrangement to define therebetween enclosed channels which extend between and open into said liquid reservoir region and into said condenser region, an inner housing having an open bottom, a closed top and vertical sides which extend down over the tops of said vertical plates and around their outer edges within said outer housing, said inner housing dividing said reservoir region into a deaeration chamber and a liquid feed reservoir in fluid communication with each other at a point below the top edges of said plates, means for admitting heated saline water through said outer housing into said deaeration chamber, means operative to maintain a pressure in said deaeration chamber close to the saturation pressure of said heated saline water, a condenser located in said condenser region and means including said condenser operative to maintain the pressure therein at a point lower than the pressure in said deaeration chamber.

2. In an evaporative type saline water conversion system the combination comprising: an outer housing having an upper liquid reservoir region and a lower condenser region, a plurality of vertical plates located within said outer housing and positioned in side by side arrangement to define therebetween enclosed channels which extend between and open into said liquid reservoir region and into said condenser region, said plates being shaped to provide channel sides which diverge to widen slightly in a downward direction and to flare outwardly near the bottom of the plates, an inner housing having an open bottom, a closed top and vertical sides which extend down over the tops of said vertical plates and around their outer edges within said outer housing, said inner partition dividing said reservoir region into a deaeration chamber and a liquid feed reservoir in fluid communication with each other at a point below the top edges of said plates, means for admitting heated saline water through said outer housing into said deaeration chamber, means operative to maintain a pressure in said deaeration chamber close to the saturation pressure of said heated saline water, a condenser located in said condenser region and means including said condenser operative to maintain the pressure therein at a point lower than the pressure in said deaeration chamber.

3. An improved vaporization device comprising an elongated vertically extending enclosed conduit, said conduit being constructed and arranged to restrict heat transfer through the walls thereof, thereby to cause vaporization taking place therein to occur by virtue of heat extraction from the unevaporated liquid flowing therethrough a liquid reservoir located above said enclosed conduit, the upper end of said enclosed conduit being fully open to liquid in said reservoir such that liquid from said reservoir flows freely down into said enclosed conduit completely filling its upper end, means associated with said liquid reservoir to maintain a first pressure above the liquid therein close to the saturation pressure of said liquid, means maintaining the lower end of said conduit at a second, lower pressure, unevaporated liquid collection means disposed directly under the walls of said conduit and a vapor passage in line with the axis of said conduit whereby effective vapor separation is achieved within the conduit itself.

4. An improved vaporization device as in claim 3 wherein the inner surfaces of said conduit are wettable.

5. An evaporator system comprising an outer housing, means inside said housing dividing its interior into an upper liquid reservoir region and a lower condenser region, a plurality of vertically-extending plates positioned in close side-by-side relationship within said housing to form a plurality of enclosed vaporization conduits extending vertically within said housing between said liquid reservoir region and said condenser region, said vaporization conduits being fully open at their upper ends to said liquid reservoir to permit liquid therein to flow directly into said conduits filling their upper ends, means associated with said liquid reservoir region for maintaining therein a liquid level higher than the upper ends of said vaporization conduits, and condenser means for maintaining a reduced pressure in said condenser region.

6. An evaporation system as in claim 5 wherein the surfaces of said plates are wooden.

7. An evaporation system as in claim 5 wherein said vaporization channels are enlarged in a region near their upper ends to form expansion chambers.

References Cited

UNITED STATES PATENTS

| | | | |
|---|---|---|---|
| 1,200,996 | 10/1916 | Soderlund et al. | 159—13 X |
| 2,334,959 | 11/1943 | Rosenblad | 159—13 |
| 2,570,212 | 10/1951 | Cross | 159—13 X |
| 2,777,514 | 1/1957 | Eckstrom | 159—13 X |
| 3,214,348 | 10/1965 | Lichtenstein | 203—10 |
| 3,214,350 | 10/1965 | Lichtenstein | 159—13 X |
| 378,843 | 2/1888 | Lillie | 159—17 |
| 2,758,061 | 8/1966 | Geller | 159—44 |
| 3,074,473 | 1/1963 | Janovtchik | 159—2 |

NORMAN YUDKOFF, *Primary Examiner.*

J. SOFER, *Assistant Examiner.*